Aug. 1, 1939.　　　　R. V. GREEN　　　　2,168,203
TUBE CUTTING MACHINE
Filed March 17, 1937　　　6 Sheets-Sheet 1

INVENTOR.
Raymond V. Green
BY Thomas L. Wilder
ATTORNEYS.

Aug. 1, 1939.   R. V. GREEN   2,168,203
TUBE CUTTING MACHINE
Filed March 17, 1937   6 Sheets-Sheet 2
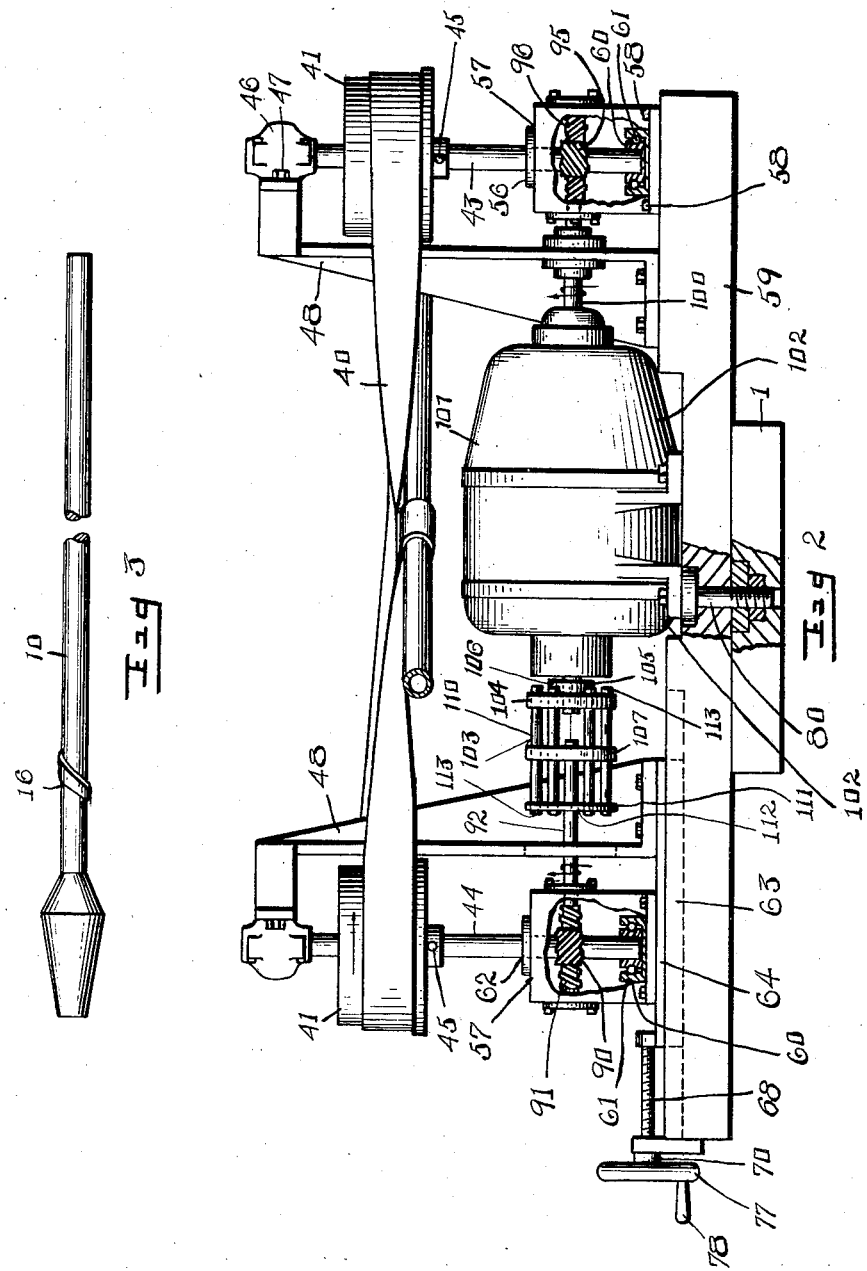
INVENTOR.
Raymond V Green
BY Thomas L. Wilder
ATTORNEYS.

Aug. 1, 1939.  R. V. GREEN  2,168,203
TUBE CUTTING MACHINE
Filed March 17, 1937  6 Sheets-Sheet 3
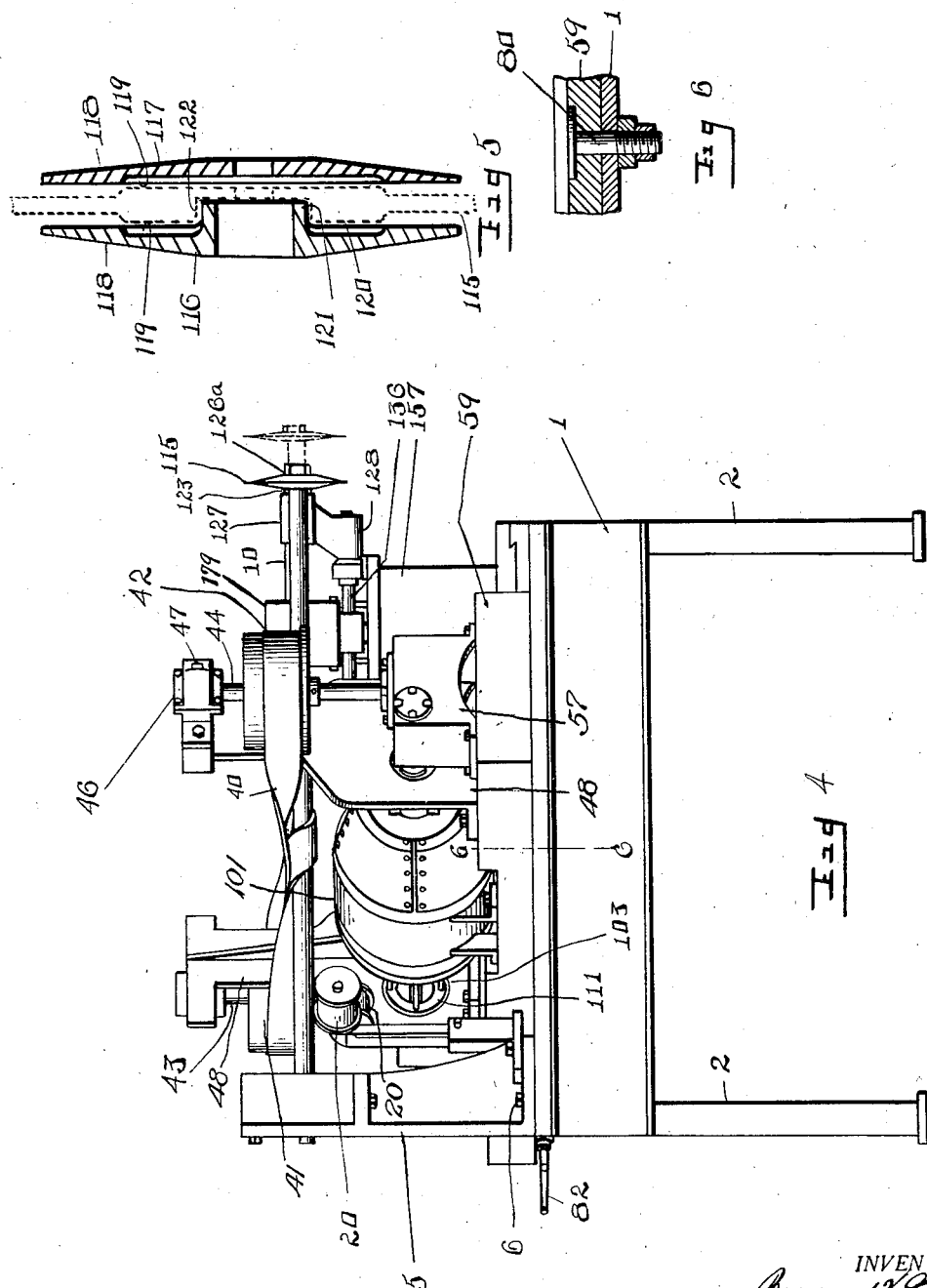

Aug. 1, 1939.   R. V. GREEN   2,168,203
TUBE CUTTING MACHINE
Filed March 17, 1937   6 Sheets-Sheet 4
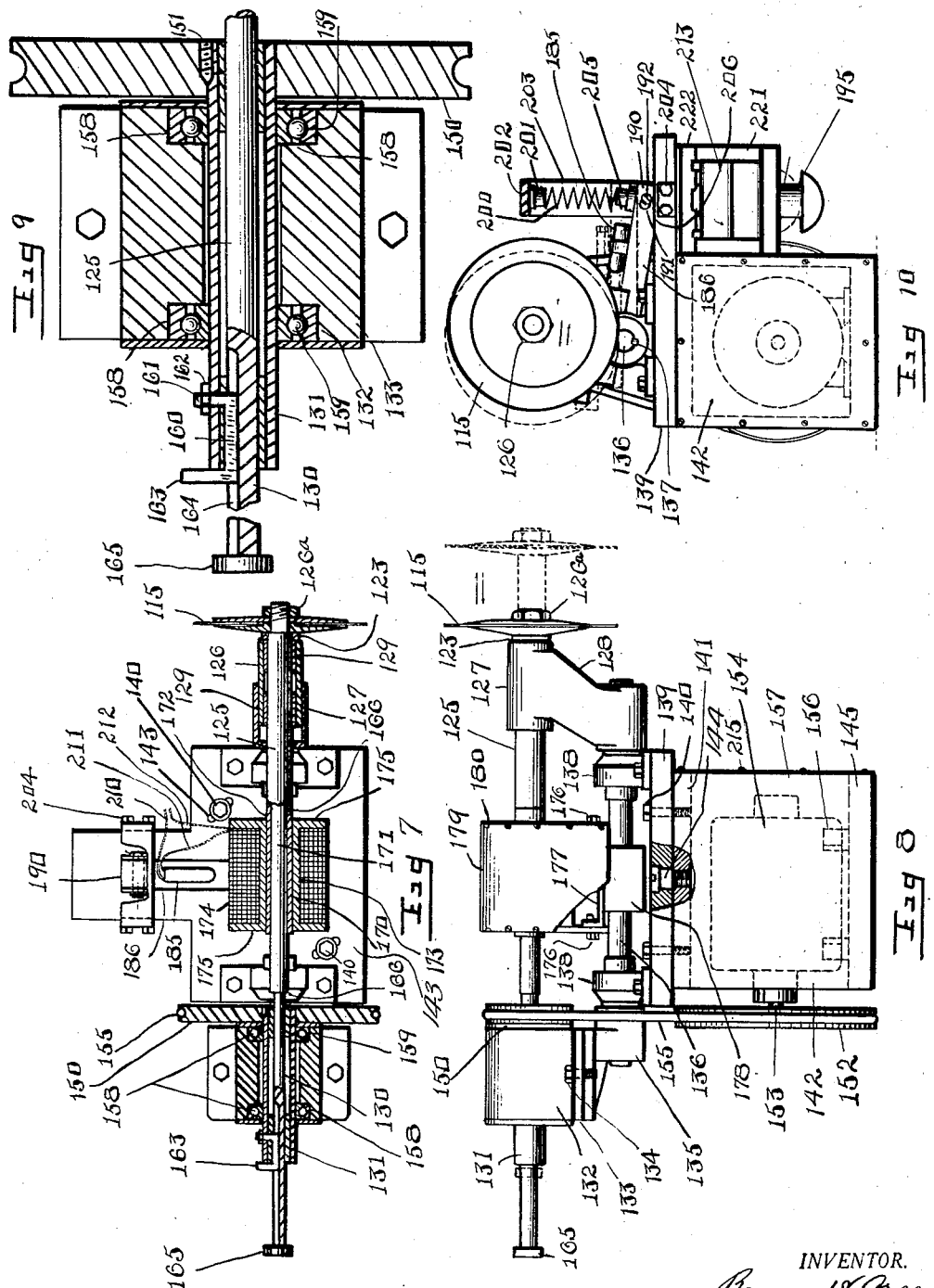
INVENTOR.
Raymond V Green
BY Thomas L. Wilder
ATTORNEYS.

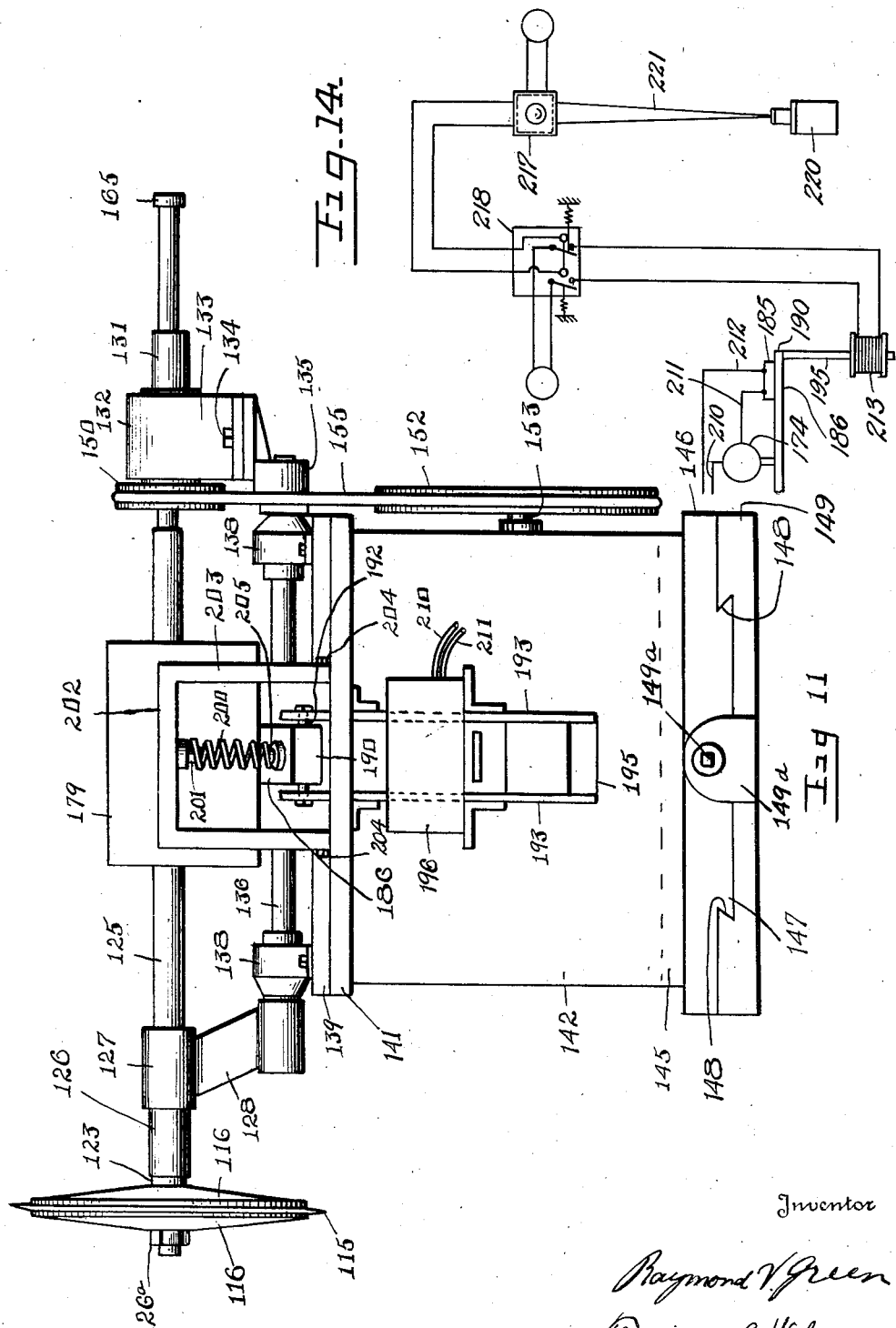

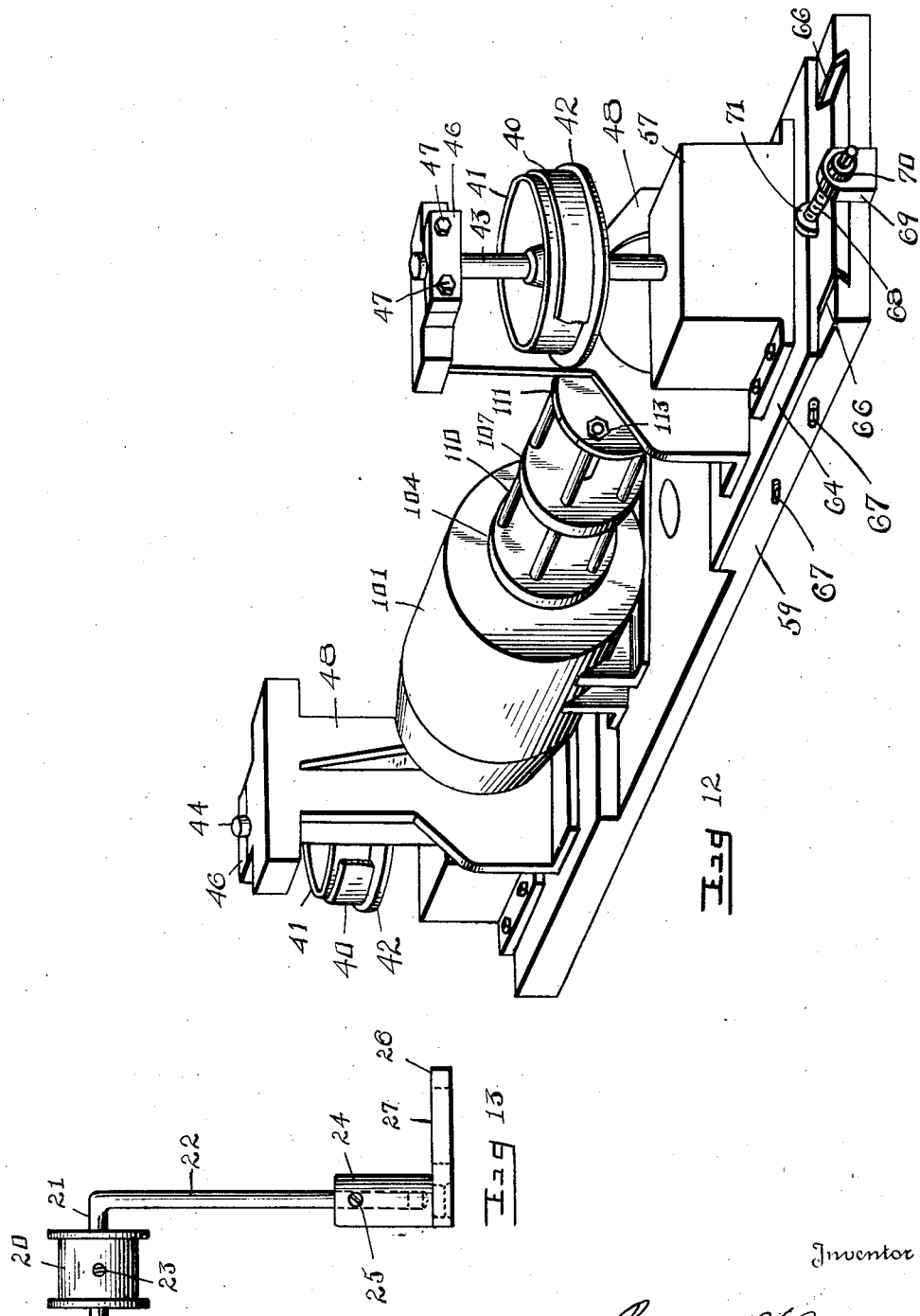

Patented Aug. 1, 1939

2,168,203

UNITED STATES PATENT OFFICE 2,168,203

TUBE CUTTING MACHINE

Raymond V. Green, Fulton, N. Y.

Application March 17, 1937, Serial No. 131,425

11 Claims. (Cl. 164—69)

My invention relates to a tube winding machine and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a machine for winding and cutting tubes that will eliminate the waste or damaging effects of the machine heretofore used on the paper used to make the tube.

Furthermore, the machine is designed to be more responsive to automatic features than those now in use. To this end the severing knife is actuated to and from cutting position by using a photoelectric cell which avoids the use of springs heretofore used for retracting the knife with the consequent waste of material.

The object will be understood by referring to the drawings in which:

Fig. 2 is a side elevation of the pulleys and connecting parts employed showing parts in section and parts broken away.

Fig. 3 is a detail view showing a mandrel employed.

Fig. 4 is an elevational view of the machine.

Figure 1:
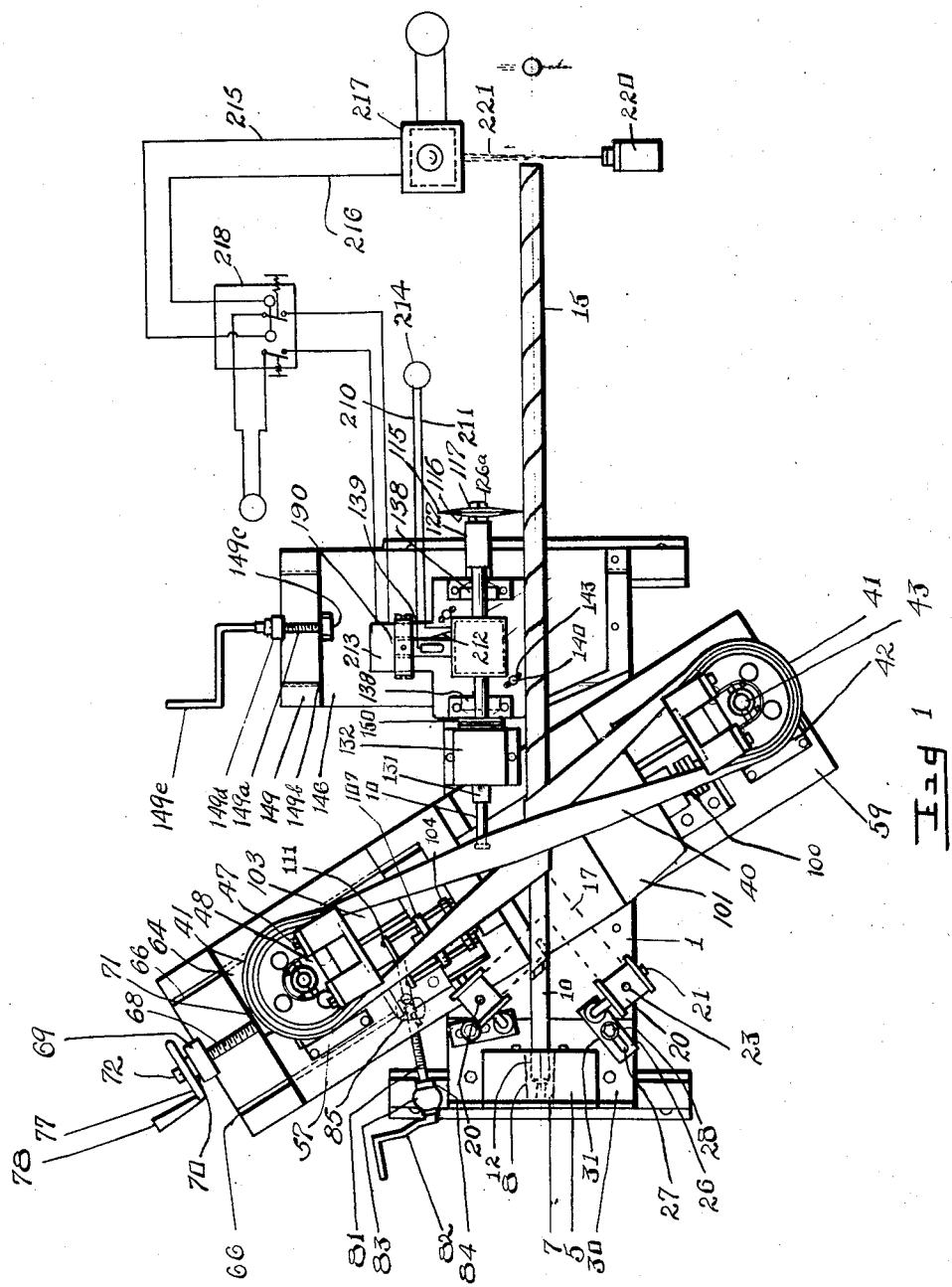
Fig. 1 is a plan view of the machine.

Fig. 5 is a detail enlarged view showing the parts for holding the annular knife employed, said parts being separated for illustrative purposes.

Fig. 6 is a section taken on the line 6, 6 of Fig. 4.

Fig. 7 is a detail view showing a plan of the annular cutting knife and motive parts connected thereto, parts being broken away and parts in section.

Fig. 8 is a side elevation of the mechanism shown in Fig. 7, parts being broken away and in section.

Fig. 9 is a detail view somewhat enlarged showing a section of a pulley and supporting sleeve employed.

Fig. 10 is an end elevation of the parts shown in Figs. 7 and 8.

Fig. 11 is a detail view enlarged showing a rear elevation of the annular knife and the parts for actuating the same.

Fig. 12 is a detail view showing a perspective with power mechanism for actuating one of the belts.

Fig. 13 is a detail view enlarged showing an elevation of a guide employed.

Fig. 14 is a circuit diagram.

Referring more particularly to the drawings, the machine embodies a table 1 supported on four legs 2. A rotatable base hereinafter mentioned is mounted on table 1. A bracket 5 is bolted at 6, 6 to the top surface of table 1. A conical shaped aperture 7 is made through the upper part of bracket 5 in which is disposed a correspondingly conical shaped bushing 8 having a tight fit therein for permanency. A hollow shaft or mandrel 10 is fixed to bushing 8. One of its ends 11 is held in the central aperture 12 of bushing 8 in a tight manner, whereby to hold said shaft 10 permanently in place in a rigid manner.

Hollow shaft 10 projects across the machine and therebeyond. It carries the paper tube 15 hereinafter described. A paper guide 16 is secured on shaft 10 and makes contact with one of said strips 17, whereby to guide one of the paper strips 17 spirally along hollow shaft 10.

The means for guiding paper strips 17, 17 to shaft 10 embodies flanged guide spools 20, 20. Each of the spools 20 is mounted on the upper horizontally disposed end 21 of shaft 22 and held by a set screw 23. The lower end of shaft 22 is sleeved to a cylindrical upstanding casing 24 and held within its central recess by a set screw 25. The lower end of casing 24 is formed integral or otherwise secured to adjustable base 26 having an elongated recess 27 through which projects bolt 28, which is screw threaded to the base part 30 of bracket 5. A washer 31 is employed to prevent the surface of head 32 of bolt 28 passing through recess 27 of adjustable base 26. The above mounting of base part 26 of casing 24 will permit it to be swung on bolt 28 as a pivot or moved longitudinally to the extent of elongated recess 27 for adjustment.

The means for winding the paper strips 17, 17 spirally upon hollow shaft 10 contemplates an endless belt 40 which is wound once around shaft 10 and carried by oppositely disposed pulleys 41, 41.

Each of the puleys 41 has a lower flange 42 and is mounted to turn with rotary shafts 43, 44 respectively by a set screw 45. The upper end of each of the shafts 43, 44 has a bearing in a journal 46, whereby it can rotate therein. Each of the journals 46 is bolted at 47, 47 to the upper end of brackets 48, 48. The lower end of shaft 43 has a bearing at 56 in casing 57 which is bolted at 58, 58 to rotatable base 59, and also in thrust bearing 60 in the base of casing 57. Thrust bearing 60 is equipped with anti-friction balls 61, whereas the lower end of shaft 44 has a bearing at 62 in a similar casing 57, which is bolted at 63, 63 to adjustable base 64.

Adjustable base 64 has a sliding fit with rotary base 59 and to this end is provided with beveled sides 65 that cooperate with corresponding sides of rotary base 59. Wear strips 66, 66 are disposed between said beveled sides 65 of rotatable base 59 and the corresponding sides of base 64. Bolts 67 are screw mounted to the lateral sides of base 59. The inner ends of said bolts 67 abut against the lateral sides of wear strips 66, whereby to push said strips 66 inward to take up any play from the wear of said contiguous beveled sides.

The means for moving base 64 longitudinally relative to base 59 for adjustment purposes embodies a threaded bolt 68 which has a threaded bearing in upstanding bearing member 69 formed integral or otherwise fastened to rotatable base 59. The opposite end of bolt 68 is swiveled to standing lug 71 made integral with base 64.

Hand wheel 77 having crank handle 78 is keyed to the outer end of bolt 68 and held between collar 70 made integral with the headed part of screw bolt 68 and nut 72 screw mounted to the end of said bolt 68.

The turning of hand wheel 77 to the right or left will move base 64 longitudinally relative to rotatable base 59, whereby to tighten or loosen belt 40.

Rotatable base 59 is pivotally supported at 80 on table 1. The means for turning base 59 on its central pivot 80 embodies a threaded bolt 81 having a crank arm 82. Bolt 81 has a bearing in journal box 83 fastened permanently to the base of bracket 5. Collars 84, 84 are disposed on either side of journal box 83 and securely attached to threaded bolt 81, whereby to hold said bolt 81 from moving longitudinally with respect to journal box 83. The opposite end of threaded bolt 81 has a threaded bearing in and projects through upstanding bearing 85 formed integral or otherwise fastened to the under side of rotatable base 59, whereby the turning of bolt 81 by crank handle 82 will rock base member 59 on its central pivot 80.

The means for rotating pulleys 41, 41 and thereby actuating belt 40 contemplates a right handed worm gear 90 tightly fixed to the lower end of upstanding shaft 44, having a bearing in casing 57 which meshes with a corresponding right handed worm 91 formed integral with horizontal adjustable shaft 92 hereinafter explained, and the left handed worm gear 95 made integral with the lower end of shaft 43, having a bearing in casing 57, and meshing with left handed worm 96 formed integral with master shaft 100.

Master shaft 100 is carried in electric motor 101 and rotated thereby. Motor 101 is bolted to rotatable base 59 at 102, 102. Master shaft 100 extends centrally way through motor 101 and beyond where it engages the expansible extension coupling 103.

Coupling 103 comprises end disc 104 having a central tubular bearing at 105 formed integral or otherwise secured to said disc 104. The extended end of master shaft 100 projects part way into tubular bearing at 105 and is keyed at 106 to cause said bearing 105 and disc 104 to turn therewith. A second disc 107 spaced from the first disc 104 is mounted to turn with said first named disc 104 and with tubular bearing 105 by means of connecting rods 110 which are projected through aligned apertures formed adjacent the peripheral edges of discs 104 and 107 and extend therebeyond to engage correspondingly aligned apertures in the third disc 111. Disc 111 has a central aperture 112 for the tight fit of adjustable shaft 92, heretofore mentioned, whereby to turn therewith. Shaft 92 also has a tight fit or is keyed to disc 107, whereby to turn therewith. End disc 104 is stationary relative to rods 110, whereas discs 107 and 111 have a sliding fit therealong. This construction will cause shaft 92 to rotate with master shaft 100 and also to move axially relative thereto. Nuts 113 are screw mounted to the ends of connecting rods 110 to hold said rods in place and to prevent end disc 111 from sliding thereoff. Said shaft 92 is movable longitudinally with base 64, as heretofore explained.

The means for cutting paper tube 15 which is formed by paper or cardboard strips 17, 17 into predetermined lengths, contemplates a circular knife 115 sandwiched between discs 116 and 117. Each of the discs 116 and 117 has its outer side beveled at 118 and each has a countersunk surface at 119 on its opposite face for the reception of the raised lateral portions 120, 120 of knife 115. Furthermore, disc 116 has a central hub portion 121 that fits into the countersunk recess 122 made on one side of circular knife 115.

Circular knife 115 and its cooperating discs 116 and 117 have a close sliding fit on rotary shaft 125 and held tight thereto by nut 126a, whereby to rotate therewith. Moreover discs 116 and 117 are between collar or bushing 123 on shaft 125 and end nut 126a which is screw threaded thereto to cause said circular knife 115 to turn with shaft 125, as above explained.

Shaft 125 is made preferably of bronze, or nonmagnetic steel, whereby it cannot be magnetized. It has a bearing at one end in sleeve 126 which is journaled in the upper bearing part 127 of rock arm 128. Narrow collars 129, 129 are disposed on shaft 125 adjacent the ends of sleeve 126, whereby to provide an oil space between shaft 125 and the inner surface of rotary sleeve 126. The opposite reduced part 130 of shaft 125 has a bearing in sleeve 131 that is journaled in the upper bearing part 132 of member 133 bolted at 134, 134 to rock arm 135. The lower end of rock arm 128 as well as that of rock arm 135 has a bearing for the projection of rock shaft 136 to which they are keyed at 137, 137. Shaft 136 is mounted to turn in bearings 138, 138 that are bolted to base 139.

Base 139 is bolted at 140, 140 to the upper plate 141 of casing 142. Said bolts engage elongated apertures 143, 143 for adjustability. A center headed bolt 144 projecting through base 139 and threaded to plate 141 can be used as a pivot upon which base 139 can be turned relative to plate 141 when bolts 140, 140 are withdrawn if desired.

The lower base plate 145 of casing 142 is bolted or otherwise secured to adjustable plate 146 having a depending central portion 147 with beveled sides 148, 148 that engage correspondingly beveled sides in the plate 149 there beneath. Plate 149 is fixed permanently to the table 1.

The means for moving adjustable plate 146 relative to plate 149 embodies a screw bolt 149a having its inner end swiveled in upstanding lug 149b fixed to plate 146. The opposite end of screw bolt 149a has a threaded engagement in an aperture in upstanding lug 149d fixed to plate 149. The end bolt 149a is angled for the application of a crank arm 149e. The turning of bolt 149a to the right or left will adjust the position of annular knife 115 relative to tube 15.

A pulley 150 is keyed at 151 to turn with the rotary sleeve 131. It is connected to a lower pulley 152 keyed to turn with the power shaft 153 of electric motor 154 by a belt 155. The legs 156, 156 of motor 154 are secured to base 145. A fibre covering 157 is used to enclose the sides of said motor 154.

The means for relieving the pull of belt 155 on shaft 125 embodies the aforesaid sleeve 131 which has thrust bearings 158, 158 in bearing part 132 of member 133. Thrust bearings 158, 158 have anti-friction balls 159, 159 therein. Sleeve 131 extends in both directions beyond member 133 sufficiently far at the right hand to allow for the mounting of pulley 150 and at the other end for the mounting of a key 160.

Although sleeve 131 does not move axially with shaft 125, it is made to rotate therewith by means of a key 160 having a threaded upstanding part 161 that projects upward through a suitable aperture in sleeve 131. A nut 162 is mounted to the threaded upward extended part to hold said key position. There is also another upstanding part 163 engaging the end of sleeve 131. Key 160 has a sliding fit in key way 164 made in the reduced part 130 of shaft 125, whereby said shaft 125 can slide longitudinally within predetermined limits in sleeve 131 as hereinafter explained although both sleeves 131 and shaft 125 rotate together as above stated. A bushing or collar 165 mounted to the end of reduced part 130 of shaft 125 limits the longitudinal movement of shaft 125 in one direction and the shoulder on shaft 125 at 166 in the other.

As above stated shaft 125 can move freely longitudinally within its bearing 127 and sleeve 131, within predetermined limits. Said shaft 125 will move to the right as seen in Fig. 8 when annular knife 115 engages paper tube 15. In this instance knife 115 is dragged along by the advance of said tube 15.

The means for retracting shaft 125 longitudinally or axially to full line position as shown in Fig. 8 contemplates sleeve 170 made of cast iron or other material readily magnetizable mounted on the first reduced part 171 of shaft 125 and held to move therewith by a set screw 172.

Sleeve 170 is projected through the central core 173 of electric magnet 174, and has a sliding fit therein. Magnet 174 is enclosed at either end with bronze housing annular members 175, 175. Housing members 175, 175 are bolted at 176, 176 to yoke member 177 that is formed integral or otherwise secured to bearing bushing 178 through which projects rock shaft 136 heretofore mentioned. Bearing bushing 178 is keyed to shaft 136, whereby to turn therewith. A fibre casing 179 is fastened by screw bolts 180 to the peripheral edges of annular members 175, 175, whereby to enclose said magnet 174. It will be observed that the above mounting of magnet 174 takes the load of said magnet 174 off from shaft 125.

When magnet 174 is electrically energized, it will draw axially said sleeve 170 and shaft 125 connected thereto to the left or within said magnet 174 as shown in full line in Figs. 7 and 8. When it is demagnetized it will allow said shaft 125 to slide axially to the right or into dotted line position shown in Figs. 4 and 8.

The means for magnetizing and demagnetizing magnet 174 embodies a mercury switch 185 that is mounted on an arm 186 which is formed integral with bearing bushing 178 and rocks therewith. Arm 186 extends toward the rear. Its free end 190 is provided with an elongated slot 191 through which projects a short shaft 192. Shaft 192 projects beyond the lateral sides of arm 186 and has tight bearings in connecting plates 193, 193.

Plates 193, 193 are connected to iron thrust core 195 of electric magnet 196 and adapted to move up and down with said core 195, whereby to rock arm 186, mercury switch 185 mounted thereon, magnet 174, annular knife 115 and other connected parts from full to dotted line position illustrated in Fig. 10. When magnet 196 is energized it will draw thrust core 195 upwards through said magnet and when demagnetized it will allow said plates 196, 196 to fall by gravity assisted by spring 20, hereinafter mentioned.

The means for holding arm 186 and its connected and related parts in normal or full line position illustrated in Fig. 10 embodies coiled spring 200 which is disposed between stud 201 fastened to the under surface of the horizontal transverse part 202 of channel shaped bracket 203 bolted at 204, 204 to the lateral edges of base plate 139 and stud 205 fastened to the upper surface of arm 186 near its free or rear end. The lower surface of arm 186 is beveled or cut away at 206, whereby to fit flush with the upper surface of base plate 139 when it is in full line position shown in Fig. 10.

Mercury switch 185 is connected in electric circuit by wires 210, 211 and 212 with magnet 174 and an electric motor dynamo 214 or some electric source of energy. Motor dynamo 214 is used to energize magnet 174. The means for rocking arm 186 and its connected parts including annular knife 115 embodies a magnet coil 213 of electromagnet 196.

Magnet 213 coil is supported in a frame 221 fastened to the framework 222 of casing 142 in such manner as to be located below the free end 190 of arm 186.

When the end of tube 15 intercepts the rays of light 221 passing from light source 220 to photoelectric cell 217, said cell 217 will send an electric impulse through relay 218 which in turn will energize magnet 213. Upon the energizing of magnet 213, iron thrust core 195 will move upward into magnet 213 and thereby elevate the free end 190 of arm 186 through connecting plates 193, 193. This will rock shaft 136 which is keyed to rock with arm 186 and shaft 125 with its connecting parts including annular knife 115 into dotted line position illustrated in Fig. 10, whereby said annular knife 115 will cut and sever the revolving paper tube 15.

Furthermore, in this dotted line position of knife 115 shown in Fig. 10 in which it engages tube 15, mercury switch 185 will be slightly tipped in the opposite direction, whereby the mercury will run towards the front and away from the electric terminals not shown of wires 210 and 211 thereupon the electric circuit through magnet 174 will be broken, whereupon said magnet 174 will be demagnetized to allow for the sliding of shaft 125 axially to the right in Figure 8 simultaneously and parallel to the axial movement of tube 15 until said annular knife 115 has reached the dotted line position illustrated in Fig. 8. At this juncture, tube 15 will be completely severed and fall into a receptacle, not shown.

Immediately said severed tube 15 falls, the rays of light 221 will be no longer intercepted and pass to photoelectric cell 217 unobstructed, whereupon said cell will automatically send an electric impulse to relay 218 which will demagnetize magnet 213 and allow iron thrust core 195 to fall. Relay 218 has switches 225 which are controlled by springs 226. This in turn will allow the free end 190 of arm 186 to move downward under pressure of coiled spring 200, whereupon mercury switch 185 mounted on said arm 186 will be tipped at an angle into full line position shown in Fig. 10, and thereby make an electric connection or circuit through magnet 174 to magnetize the same and retract sleeve 170 and shaft 125 projected therethrough to full line position illustrated in Figs. 4 and 8 where knife 115 will be ready for the next succeeding advance to cut tube 15.

The means for rapidly rotating annular knife 115 embodies the aforesaid electric motor 154 which is connected to shaft 125 by pulleys 150, said 152 therebelow and belt 155 as above described. Moreover, motor 154 is housed in casing 142. Fiber pieces secured by screw bolts 215 enclose the sides of casing 142.

The operation of the machine is effected by feeding the paper strips 17, 17 from opposite sides over spools 20, 20 onto stationary shaft 10. Guide 16 will contact one of said strips 17 to aid in directing said strips in a spiral manner along said shaft 10. Furthermore, said strips 17, 17 are fed so as to slightly overlap on their respective edges and will move under belt 40.

The paper strips 17, 17 thus started initially will be pushed along on stationary shaft 10 by belt 40 and beyond the right hand end of said shaft 10. When the free end of tube 15 moves opposite light 220 it will intercept the rays 221 and prevent them from reaching photoelectric cell 217, which will send an electric impulse to relay 218, that in turn will cause an electric current to energize magnet 213 whereupon iron thrust core 195 will be drawn upwards into said magnet 213 and simultaneously elevate connecting plates 193, 193, whereby to rock arm 186 and connected parts including mercury switch 185 and annular knife 115 into dotted line position shown in Fig. 10. Annular knife 115 will thereupon cut tube 15 which revolves as it progresses axially.

In this latter position of arm 186, mercury switch 185 will break automatically the electric circuit through magnet 174 and thereby allow shaft 125 to travel axially simultaneously with annular knife 115 which will be dragged along to dotted line position illustrated in Fig. 8 by its engagement with traveling tube 15. At the dotted line position shown in Fig. 8 tube 15 will have made one complete revolution in contact with annular knife 115 and be severed, whereupon said severed part will fall into a receptacle, not shown.

Immediately said severed part of tube 15 falls, the rays of light 221 will pass unobstructed to photoelectric cell 217, which will send an electric impulse through relay 218 to break the electric circuit to magnet 213, thereupon thrust core 195 and connecting plates 193, 193 will fall. This will allow arm 186 to rock back to full line position shown in Fig. 10 under pressure of coiled spring 200, whereupon annular knife 115 will be withdrawn from any further contact with tube 15 and simultaneously mercury switch 185 will cause an electric circuit through magnet 174. Magnet 174 will retract sleeve 170 and shaft 125 connected thereto to full line position illustrated in Fig. 8 where it will be ready for the next cycle of operations above described.

In the event belt 40 needs tightening the operator will turn crank handle 78. Its angle relative to mandrel 10 can be determined by turning crank handle 82. Furthermore, the adjustment of knife 115 relative to tube 15 can be controlled by turning crank arm 149e.

Having thus described my invention what I claim as new and desire to secure by Letters Patent is as follows:

1. In a tube winding machine, a knife mounted on a movable shaft, movable in both a parallel direction along its axis and also transverse thereto, an electric magnet for moving said shaft in one direction and a bearing for allowing said shaft to move freely in the opposite direction.

2. In a tube winding machine, a life for cutting a tube, a shaft for supporting said knife, a magnetizable sleeve mounted on said shaft, a magnet for supporting said sleeve, means for energizing said magnet, whereby to move said shaft axially and means for demagnetizing said magnet, whereby to allow said shaft to move freely in the opposite direction.

3. In a tube winding machine, an annular knife for cutting a tube, a shaft for supporting said knife, a magnetizable sleeve mounted on said shaft, an electric magnet for supporting said sleeve, automatic means for magnetizing said magnet, whereby to move said shaft axially and means for rotating said shaft.

4. In a tube winding machine, an annular knife for cutting a tube, a shaft for supporting said knife, a magnetizable sleeve mounted on said shaft, an electric magnet for supporting said sleeve, means for energizing said magnet, whereby to move said shaft axially and means for rocking said shaft and knife carried thereon within predetermined limits.

5. In a tube winding machine, a knife, a shaft for supporting said knife, a sleeve mounted on said shaft, an electric magnet for supporting said sleeve, a mercury switch for magnetizing said magnet at predetermined intervals, whereby to move said shaft axially and other means for rocking said knife within predetermined limits.

6. In a tube winding machine, an annular knife, a rotatable shaft for supporting said knife, a sleeve mounted on said shaft, an electric magnet for supporting said sleeve, a mercury switch for magnetizing said magnet, whereby to move said shaft axially, a pulley for rotating said shaft and means for relieving the load of said pulley on said shaft.

7. In a tube winding machine, an annular knife for cutting a tube, a non-magnetic shaft for supporting said knife, a magnetizable sleeve mounted on said shaft, an electric magnet for supporting said sleeve, a mercury switch for magnetizing said magnet, whereby to move said shaft axially and means for rotating said shaft, whereby to revolve said knife.

8. In a tube winding machine, an annular knife for cutting a tube, a non-magnetic shaft for supporting said knife, a magnetized sleeve mounted on said shaft, an electric magnet supporting said sleeve, a mercury switch for magnetizing said magnet, whereby to move said shaft axially, another sleeve mounted adjacent said shaft and turning therewith and a pulley connected with said last named sleeve, whereby to rotate said sleeve and shaft.

9. In a tube winding machine, an annular knife, a shaft for supporting said knife, said shaft having a reduced part, a magnetizable sleeve mounted on said reduced part, an electric magnet for supporting said sleeve, a mercury switch for magnetizing said magnet, whereby to move said shaft axially and means for rotating said shaft and knife mounted thereon.

10. In a tube winding machine, an annular knife for cutting a tube, a shaft having a reduced portion for supporting said knife, a magnetizable sleeve mounted on said shaft and adapted to move therewith, an electric magnet for supporting said sleeve, automatic means for magnetizing said magnet at predetermined intervals, whereby to move said shaft axially and means for rotating said shaft and knife carried thereon.

11. In a tube winding machine, an annular knife, a shaft having a reduced portion for supporting said knife, a magnetizable sleeve mounted on said shaft, an electric magnet for supporting said sleeve, means for magnetizing said magnet, whereby to move said shaft axially at predetermined intervals, a second sleeve mounted adjacent said shaft, a pulley mounted on said second named sleeve and means for connecting said second named sleeve with said shaft, whereby the rotation of said pulley will rotate said shaft and knife carried thereon.

RAYMOND V. GREEN.